United States Patent

[11] 3,599,589

| [72] | Inventor | Harold M. Busey |
| | | Kennewick, Wash. |
| [21] | Appl. No. | 694,479 |
| [22] | Filed | Dec. 29, 1967 |
| [45] | Patented | Aug. 17, 1971 |
| [73] | Assignee | McDonnell Douglas Corporation |

[54] EARTHQUAKE-RESISTANT NUCLEAR REACTOR STATION
2 Claims, 4 Drawing Figs.

[52] U.S. Cl. .................................................. 114/0.5, 114/43.5
[51] Int. Cl. ................................................... B63b 35/44
[50] Field of Search ........................................ 114/0.5 F, 0.5 D, 43.5

[56] References Cited
UNITED STATES PATENTS

| 1,088,239 | 2/1914 | Paine........................... | 114/0.5 |
| 1,713,457 | 5/1929 | Vaughan...................... | 114/43.5 |
| 2,488,542 | 11/1949 | Houghtaling................ | 114/43.5 |
| 2,645,114 | 7/1953 | Amirikian.................... | 114/0.5 |
| 3,029,606 | 4/1962 | Olsen........................... | 114/43.5 |
| 3,444,693 | 5/1969 | Busey........................... | 61/5 |

*Primary Examiner*—Andrew H. Farrell
*Attorneys*—Walter J. Jason, Donald L. Royer and Robert O. Richardson

ABSTRACT: A floating structure for the protection of nuclear reactors from damage during earthquake shock wherein the structure is designed to absorb shocks without rupture of critical nuclear reactor equipment.

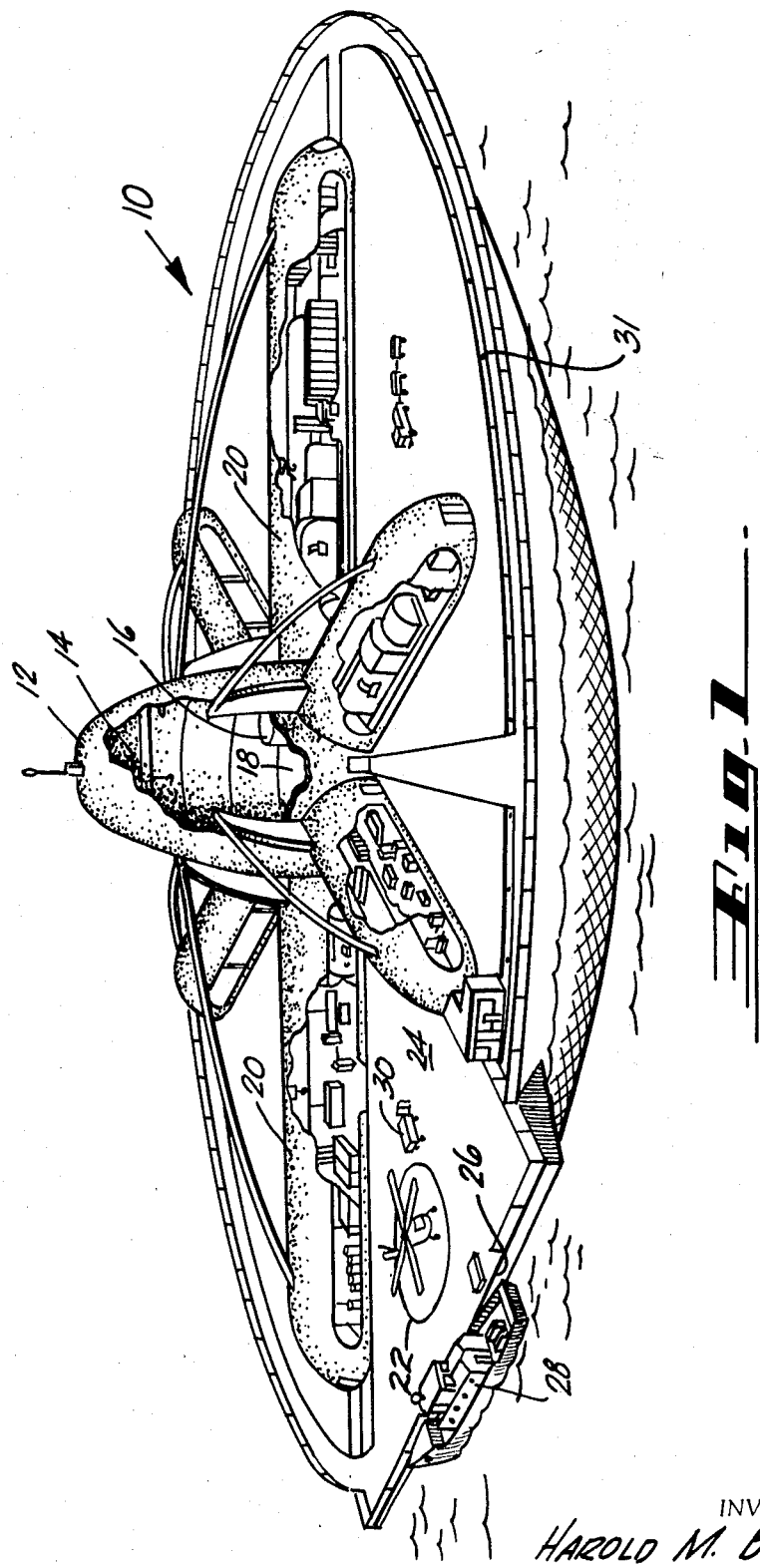

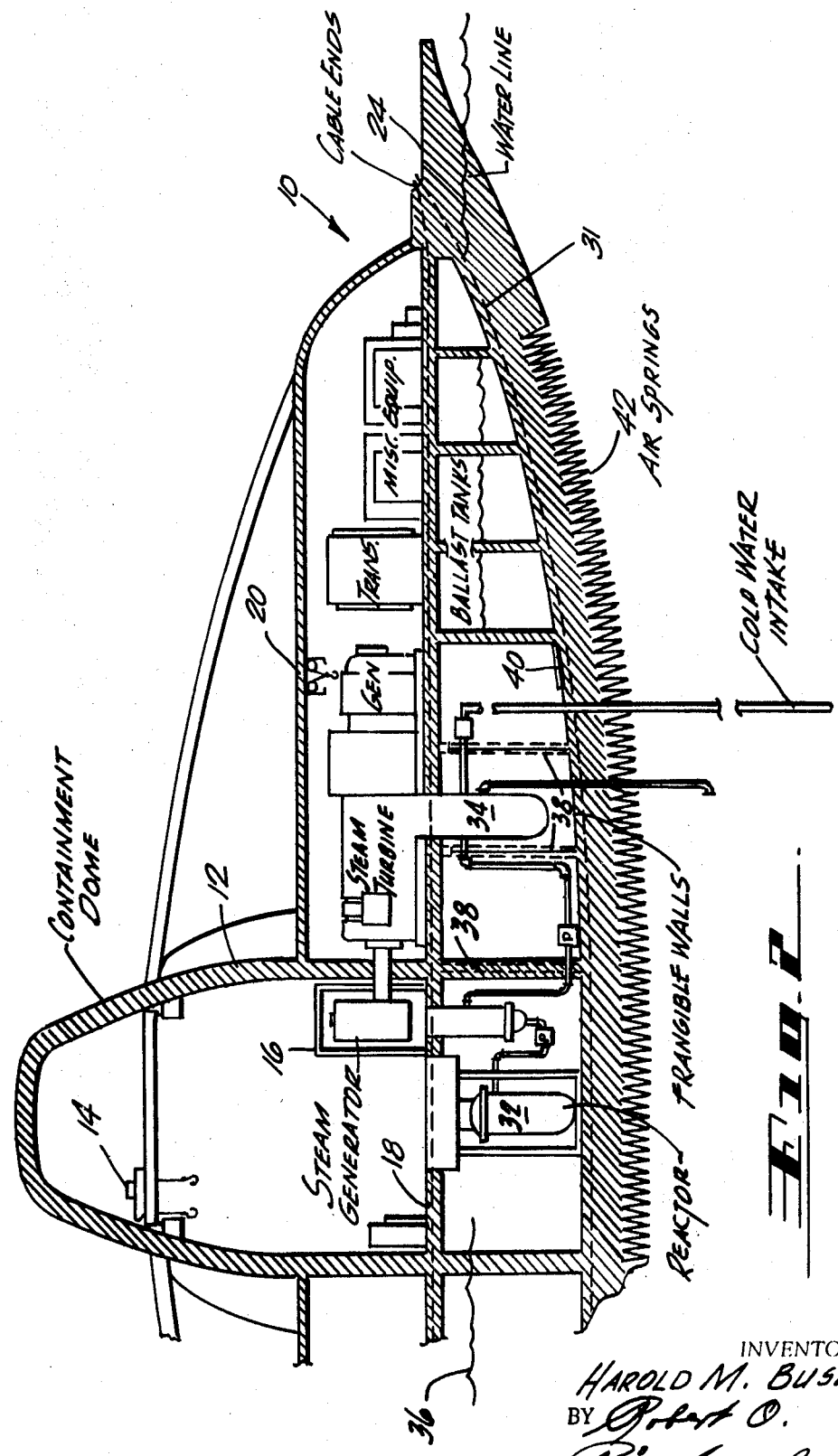

INVENTOR.
HAROLD M. BUSEY
BY Robert O. Richardson
—ATTORNEY—

3,599,589

EARTHQUAKE-RESISTANT NUCLEAR REACTOR STATION

BACKGROUND OF THE INVENTION

The importance of overcoming the potential hazards to a nuclear power station that might result from a seismic disturbance may be appreciated from a study of extrapolated data from recorded earthquakes. Appropriate anticipated earthquake intensities with significant horizontal and vertical accelerations and displacements may be determined on the basis of probability. It has been recognized that if an earthquake should occur of significant magnitude to cause large fissures or displacements directly below the structure under consideration or between critical elements, it would be extremely difficult to prevent serious damage to the reactor system and hazardous safety conditions to the surrounding population.

To successfully resist the effects of the hypothetical earthquake, the most reliable and safest concept must provide for an extremely strong platform on which the reactor and its components will be supported. With a strong platform, the differential movement of one element of the facility relative to another will be minimized. A rigid platform, supported on a manmade island placed on a thick layer of alluvium, will experience large forces if the vertical and horizontal displacements occur in close proximity to the structure. Excessive consolidation will take place under these conditions; whereas, if the foundation materials are incompressible rock, the motions to which the facility will be subjected will be greatly reduced. However, if the facility is placed on soil directly over a fault and if a violent earthquake occurs, its ability to remain operable and safe is greatly reduced.

Since an incompressible foundation material is not always available, the present invention relates to the use of a strong deck barge floating in the ocean. Although this will be subject to motion, relative displacements to the reactor components can be kept to an absolute minimum; and the safety of the reactor and the population can be assured.

Floating islands, bridges, docks, and drydocks, and their construction are well known. Midocean stations, floatable lighthouses, and other floating marine structures are in existence. While these are special-purpose structures which serve the purpose for which they were intended, they have not required the safety and reliability of a structure that would support and protect a nuclear reactor plant from storm waves, a tsunami, earthquake shock, or severe displacement of the ocean bottom.

SUMMARY OF THE INVENTION

A nuclear reactor station offering the greatest safety and reliability is that of a single strong base support for all elements of the reactor. This can be achieved by proper placement of reactor components on a floating platform. This barge utilizes a vessel geometry and compressible gas cushions to minimize displacement during earthquake shock. Also frangible walls separating many compartments are used so that in the event of gas release from a reactor system, more contained and shielded expansion volume would be available than in the normal case of the standard reactor secondary containment system. The secondary containment system of the present invention is activated by pressure rise. To protect a nuclear station and its components from a seismic shock, a large, prestressed concrete barge that is formed as a hemispherical segment is utilized. Resistance to damage from horizontal seismic waves is provided for by the hemispherical shape of the bottom of the barge. A pulse of energy travelling through the water causes a slight water movement and will tend to flow by the barge while the barge remains stationary because of its own inertia. The structure presents no large surfaces perpendicular to the direction of a horizontal seismic wave. Protection from a vertical seismic shock is provided by having a cone, triangular pyramid, or other-shaped cavities covering most of the bottom of the structure. These are filled with air or other gases which are exposed directly to the water floating the barge. A float or pliable diaphragm may be used to separate the air from the water at the bottom of these cavities. When a pulse of energy strikes vertically against the bottom of this reactor station, there will be a movement of water up into these cavities. This will compress the air trapped in the vertical cavities and act as an air spring. Then, the station by its inertia will tend to remain stable and only rise and fall slowly due to this energy input. By this decoupling, shock will be minimized to the equipment within and on top of the concrete vessel. At convenient intervals the quantity of air trapped in the vertical columns may be checked to determine that proper air spring effect is always available. To overcome loss of air that is believed to be inevitable with the passage of time, inlet valves are provided for pumping air into the use columns to force water out and to maintain the desired air cushion.

BRIEF DESCRIPTION OF THE DRAWINGS

For a better understanding of the present invention, reference may be had to the drawings wherein:

FIG. 1 is a perspective view with parts broken away of the floating power station;

FIG. 2 is a sectional view;

FIG. 3 is an enlarged view of a portion of the bottom; and

DESCRIPTION OF ILLUSTRATIVE EMBODIMENTS

Figure 4:
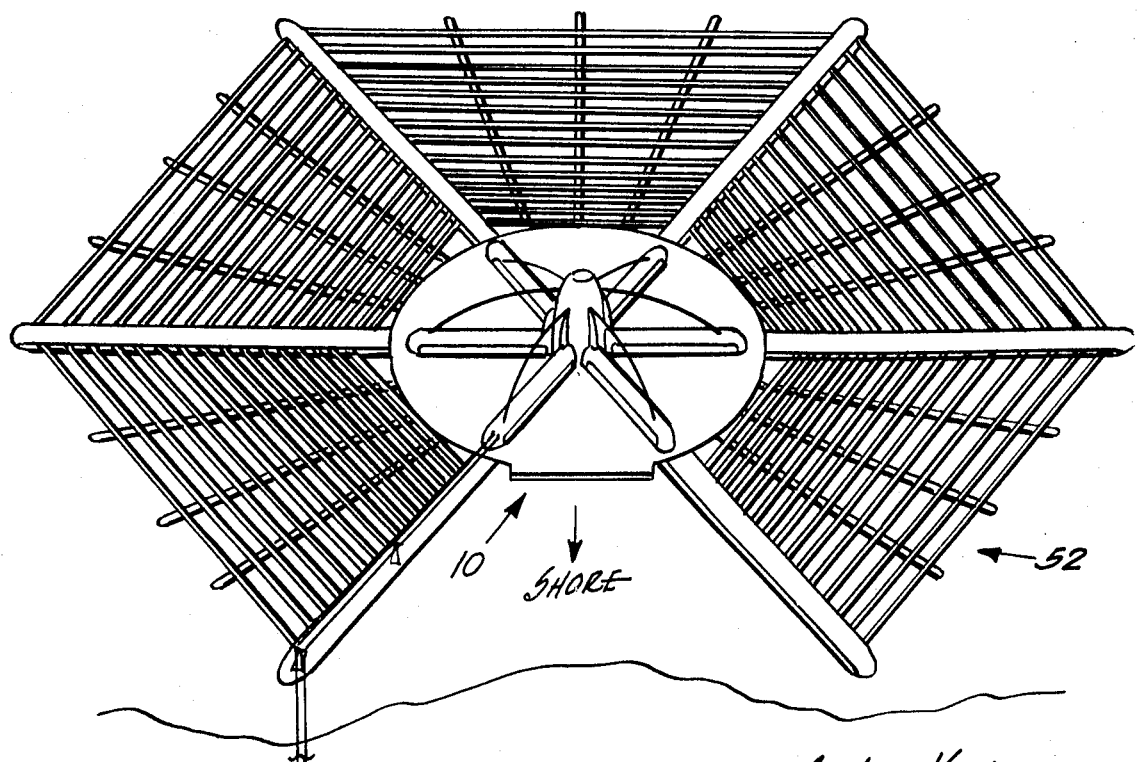
FIG. 4 is a perspective view illustrating the floating power station in use with a wave suppressor system.
Figure 5:
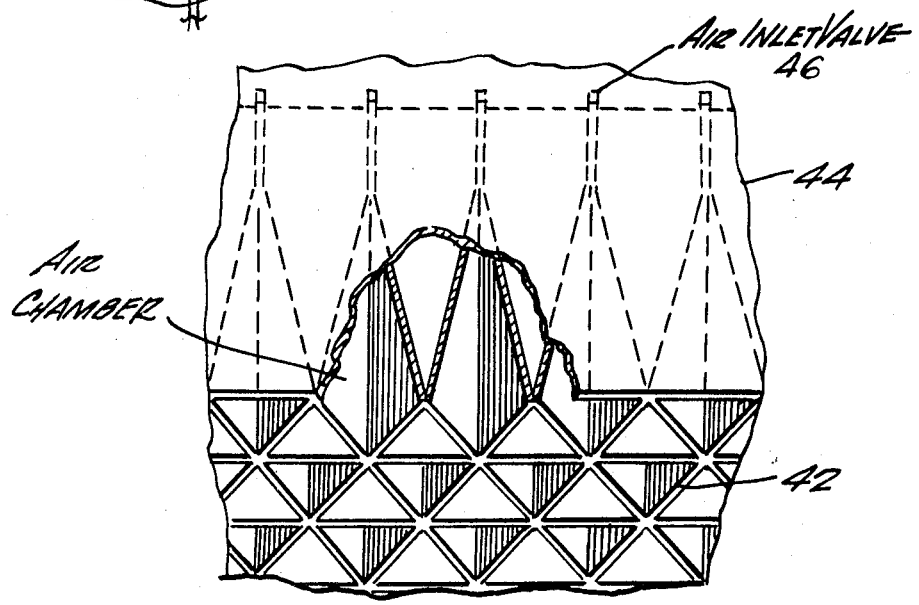

An inverted dome-shaped barge 10 has in its center a large, concrete dome 12 as characterized by modern nuclear-power-generating stations. These domes are built with certain volumes available, such that all of the pressure rise due to the escape of the coolant within the reactor due to any conceivable release, will not exceed the pressure containing ability of the dome. Within this housing is a crane 14, missile shield 16, a steam generator, while the reactor equipment is below deck 18 within the dome. Connected to this dome are a plurality of housings 20 extending outwardly therefrom in a manner resembling spokes from the hub of a wheel. Within these housings are personnel living quarters, work spaces, storage facilities, power conversion equipment, etc. A heliport 22 is provided on the deck 24. While the deck 24 generally is of a circular configuration to constitute a cover for the barge 10, adjacent one edge 26 is a loading and landing dock for supply and transportation vessels, such as vessel 28. A cargo moving vehicle 30 is adapted to transport supplies from the dock 26 to the various housings 20.

As shown in FIG. 2, the earthquake resistance structure, in the form of a generally circular concrete barge 10, is shaped as a spherical segment so that protection is afforded from horizontal seismic waves by means of this shape presenting a minimum of flat surfaces perpendicular to the direction of the horizontal shock wave. Additional strength is afforded by tension cables 31 in the deck 24 and hull 44. This inverted, partial-domed vessel has its reactor 32, steam condenser 34, and other components supported at about the water level 36. Further safety can be incorporated in that many cavities are built within this barge. These are connected by means of frangible walls 38 such that in the event of a pressure rise in the central containment vessel, these walls would be blown out, making available the added volume of these other cavities. These cavities could be connected in series so that as the pressure goes up more containment volume would be provided. This would not cause a hazardous radiation exposure to personnel on the above deck because these cavities would be covered with sufficient mass of the concrete deck which would afford protection in the event of gas flowing into these chambers.

Finally, as an additional safety factor, when all of the expansion cavities have been consumed in the expansion of some gas release, then the last cavity could be a frangible wall 40 between it and the sea beneath the station. As a last resort before rupture of the secondary containment, if in the improbable case that gas is still to be disposed of, it could be vented beneath the vessel. Here it would get a water scrubbing before it reached the atmosphere.

The saucer shape of the generally circular concrete barge affords protection from horizontal seismic waves. Protection from vertical seismic waves is provided by means of the air spring effect, wherein air is trapped in many small cavities 42 in the bottom of the vessel, these cavities being of such length and being of such configuration that as water is forced into these cavities by means of the shock wave, an air spring results as the air is compressed. In this manner, a force exerted against the bottom of the vessel is no longer a shock wave.

One embodiment of the air spring construction is shown in FIG. 3. Here a plurality of pyramid-shaped cavities 42 extend inwardly into concrete 44 of the bottom of the structure. These cavities preferably have a nonlinear spring coefficient. Air inlet valve 46 at the upper end of these cavities permits air under pressure to be pumped into the cavities to force any water therein to be forced out and to provide a compressible air cushion against which shock waves may be absorbed.

As to the method of construction, a hemispherically shaped basin could be excavated below the water table in an area either adjacent to the ocean or near a river and then by a gigantic sand-casting technique; molds could be erected to cast the cavities in the bottom of the vessel and conduits installed for placement of post tension cables. Concrete is then poured around these molds and conduit. After the concrete has hardened, cables are installed with strain gages for monitoring their tension. Water is then admitted around this structure, and the entire vessel floated out. The vessel could be towed out to sea if an offshore station was desired. If this is to be used inland, it might be located near a river for a cooling water supply. It also could remain floating in a moat which was the initial form for casting of the concrete.

The wave suppressor system, such as is shown in FIG. 4, may be used to protect the barge 10 from storm waves. The net hydroacoustic shock caused by an earthquake may be no more severe on the vessel than similar wave action caused by a storm in unprotected waters. Remote earthquakes may cause a tsunami, but the relative long rise and fall of the tsunami would cause no accelerations of significance if the station is spaced far enough from shore. The displacement of the ocean floor below the floating platform would cause shock waves; however, the shock load received by the floating platform would be less than that received by a similar structure on land due to the decoupling effect. The acceleration on the platform would be further lessened by the application of air spring assemblies in which the air in the cavities compresses and in so doing cushions the shock waves. Notwithstanding the severity of the seismic criteria, the reactor and its components would be subject to much less acceleration on a floating platform than would be expected on any land mass, and its relative displacements would be minimized.

Wave energy is observed by the apparent motion of a mound of surface water moving in the direction of flow of the wave energy. However, individual increments of water in the motion actually move in a vertical circle with little horizontal translation outside the wave amplitude. The action of wave suppression is based on interference with this circular movement. Any object rigidly held in the rolling water will exert a dampening influence to the motion and convert some of the mechanical energy of the wave into random turbulence and ultimately to heat of the water. To dampen the water waves, the structure 52 is provided which is sufficiently strong to withstand the wave energy while disrupting the flow and converting the wave energy to turbulence. This dampening is done sequentially as a wave travels through the structure so that the full force of the wave is not exerted upon the first part of the structure encountered. Floating bars with buoyancy cavities forming the rigidly connected raft are used for this purpose. The most effective elements in this wave-suppressing device are those located at or slightly below the water surface. Those members located under the pad are for reinforcing purposes to hold wave suppression elements in a fixed relative position. The horizontal elements which extend transverse to the wave direction are held rigid relative to each other by this supporting structure. These elements are spaced progressively closer together from the outer edge facing the wave motion inwardly, in the direction toward the calm water area. This spacing commences at the outer edge with elements spaced approximately a wave height apart. The spacing of adjacent elements then decreases by about 8 percent of the preceding spacing. In this manner, the first elements of the structure do not absorb the full impact of the wave energy but only a portion as the water pours between these elements. With decreasing spaces toward the calm water area, the assembly will dampen the wave as much as is desired. The entire raft should be a total length at least 1.5 to 2 wave lengths of the largest expected wave. For a more complete description of such wave-suppressing structure, reference is made to my copending application, Ser. No. 618,841, filed Feb. 27, 1967.

If the power station is intended to be floated in shallow water, a breakwater can be built in a manner typical of that along many coastlines for the protection of small boats, docking facility and beach lines. Although not a part of this invention, except in combination therewith, there are many mooring schemes for retaining this station in longitudinal position. The use of large concrete barges with skirts that can be towed to the site and sunk is one such mooring system. The skirts may be covered by pumping sand over them to help hold the anchor in place. The anchor cables could have an appreciable weight attached so that the wind forces on the station would elevate the weight and exert a force to return the raft back to its intended position.

With the nuclear power plant floating in water in the manner above described, the seismic displacements and accelerations produce little effect on the floating reactor station due to the decoupling action of the water. The normal approach to ensure the integrity of reactor containment when subjected to severe seismic forces would be to use a very strong structure to withstand these forces and displacements. This would be very costly, and the absolute reliability of nuclear safety attainment would still be in doubt. By using the decoupling principle inherent in the floating platform of the present invention, the need for new designs and approaches for a containment system is minimized. No new concept of the nuclear system is needed to adapt to a floating station where it will be protected from seismic shock. Fundamentally, all of the basic station components are mounted upon one strong barge-type platform so that they can only move as a single unit with the entire structure.

Having thus described the invention, it is to be understood that there are many modifications and variations that will readily occur to those skilled in the art; and it is to be understood that these deviations from the embodiment just described are to be considered as part of the invention as set forth in the appended claims.

What I claim is:

1. An earthquake-resistant nuclear power station comprising:

a floatable barge having power plant equipment therein, said barge having air springs in the hull thereof to absorb shock transmitted through the water on which it floats, said barge being of inverted-dome-shaped spherical segment configuration whereby the shape presents no large flat surfaces to encounter shock wave fronts, said air springs being cavities for entrapping compressible gases, suitable valve means for transmitting said gases to said cavities, said barge having compartments separated by frangible walls such that additional gas containment volume is provided upon rupture of said walls in sequence as needed, and an additional frangible wall which, when ruptured, exposes expanding gases to said water on which said barge floats.

2. An earthquake-resistant nuclear power plant as in claim 1 wherein said frangible walls are below the waterline of said barge, said barge having in its center section a large dome for withstanding pressure rise due to escape of coolant within nuclear reactor equipment within said dome and whereby excessive pressure will first rupture said frangible walls to direct gases through water before escaping into the atmosphere.